(12) United States Patent
Becker et al.

(10) Patent No.: US 7,438,357 B2
(45) Date of Patent: Oct. 21, 2008

(54) HEADREST OF AN AUTOMOTIVE VEHICLE SEAT WITH A PRESSURIZED GAS DRIVE SYSTEM

(75) Inventors: Burckhard Becker, Solingen (DE); Rolf Steinmetz, Düsseldorf (DE); Thomas Thiel, Solingen (DE)

(73) Assignee: C. Rob. Hammerstein GmbH & Co. KG, Soligen (DE)

( * ) Notice: Subject to any disclaimer, the term of this patent is extended or adjusted under 35 U.S.C. 154(b) by 3 days.

(21) Appl. No.: 11/119,117

(22) Filed: Apr. 29, 2005

(65) Prior Publication Data

US 2006/0006708 A1 Jan. 12, 2006

(30) Foreign Application Priority Data

Jun. 25, 2004 (DE) ......... 10 2004 030 892
Jan. 7, 2005 (DE) ......... 10 2005 001 048

(51) Int. Cl.
*B60N 2/42* (2006.01)

(52) U.S. Cl. .................. 297/216.12

(58) Field of Classification Search ............. 297/216.2, 297/408; 180/282; 280/751, 748
See application file for complete search history.

(56) References Cited

U.S. PATENT DOCUMENTS

| | | | | |
|---|---|---|---|---|
| 4,099,779 A | * | 7/1978 | Goldner | 297/408 |
| 4,191,423 A | * | 3/1980 | Goldner | 297/408 |
| 4,256,341 A | * | 3/1981 | Goldner et al. | 297/410 |
| 4,720,146 A | * | 1/1988 | Mawbey et al. | 297/409 |
| 5,842,738 A | * | 12/1998 | Knoll et al. | 297/216.12 |
| 5,882,071 A | * | 3/1999 | Fohl | 297/216.12 |
| 5,927,804 A | * | 7/1999 | Cuevas | 297/216.12 |
| 5,975,637 A | * | 11/1999 | Geuss et al. | 297/391 |
| 6,079,776 A | * | 6/2000 | Breitner et al. | 297/216.12 |
| 6,474,733 B1 | * | 11/2002 | Heilig et al. | 297/216.12 |
| 7,070,205 B2 | * | 7/2006 | Becker et al. | 280/751 |
| 7,293,829 B2 | * | 11/2007 | Thiel et al. | 297/216.12 |
| 2002/0195846 A1 | * | 12/2002 | Masuda et al. | 297/216.12 |
| 2006/0119150 A1 | * | 6/2006 | Hoffmann | 297/216.12 |

* cited by examiner

*Primary Examiner*—Joseph F Edell
(74) *Attorney, Agent, or Firm*—McCarter & English, LLP

(57) ABSTRACT

A vehicle seat headrest with a carrier structure including at least one bar and a supporting member in a normally utilization position. In the event of an accident, the supporting member leaves the utilization position and assumes a crash position, in which the supporting member is located in front of the utilization position at least in the x-direction. An expandable container is disposed between the bar and the supporting member in a normally non-expanded state. A source of pressurized gas is connected to the container. A trigger device releases the gas in the event of an accident so that the expandable container is filled with gas and is in an expanded state so that the supporting member is in the crash position.

11 Claims, 5 Drawing Sheets

HEADREST OF AN AUTOMOTIVE VEHICLE SEAT WITH A PRESSURIZED GAS DRIVE SYSTEM

FIELD OF THE INVENTION

The application relates to an optimized headrest for the seat of an automotive vehicle e.g., for a front seat thereof. In a known manner, the headrest comprises padding providing safe and comfortable head support for the occupant of said seat. A supporting member, which is located substantially behind the padding and is padded thereby, provides mechanical stability to the headrest. Finally, the headrest has a carrier structure that is connected to a seat back of the seat and comprises at least one bar. Typically, said bar is slidably disposed in the seat back. In most cases, two bars are provided for. An advantage is achieved when the incline of the supporting member can be adjusted relative to the bars.

DESCRIPTION OF THE RELATED ART

In the event the automotive vehicle is involved in an accident, it is important that the occupant's head be supported by the headrest. This is particularly important as far as rear impacts are concerned. Usually, the head of an occupant will not continuously rest on the padding; normally, the occupant will rather hold his head at a certain distance from the padding of the headrest. This is disadvantageous in accident situations because, in an accident situation, the occupant's head will have to move a certain distance before coming to rest against the headrest. It is well known that precisely the backward movement of the head relative to the upper body is disadvantageous as it may cause damage to the cervical spine. This injury is known as "whiplash". The art teaches various approaches to restrain backward movement of the head relative to the trunk in accident situations. Proposals have been made for example, in which the overall headrest is actively moved forward or in which the occupant's upper body sinks deeper into the padding of the seat back.

SUMMARY OF THE INVENTION

The invention also aims at possibly preventing, at least restraining, an occupant's head from moving backward in an accident situation. It is the object of the invention to develop a headrest which, in the event of a crash, provides support in closer proximity to the occupant's head than in the normal operating condition of the automotive vehicle, using the simplest possible means.

The solution to this object is achieved by the headrest having the features of claim 1.

In this headrest, there is provided a fast actuation drive in the form of an expandable container that is supplied with pressurized gas from a source in the event of an accident. Said container expands very fast from its normal state in which it is not expanded, to the expanded state, thereby taking the supporting member along, the expandable container being supported by the at least one bar or by a part connected therewith. This permits to move the support member from the utilization position into the crash position within the available time to do so. This length of time starts when the crash sensor responds and must have ended before the head of an occupant is snapped backwards, towards the supporting member.

Various configurations of the expandable container are possible. A piston and cylinder unit may for example be utilized, with the piston being for example connected to the bar and the cylinder with the supporting member (or vice versa). Said piston and cylinder unit may exert either a compressive force or a tensile force. A small airbag may also be used as the expandable container. It is preferred that the expandable container expands in the direction in which the supporting member is to be moved away from the bar, meaning in the x-direction and in the z-direction. A member that may be unfolded in accordion style, for example an undulated cylinder that is closed at its ends, is also suited for the expandable container.

An electrically ignitable pyrotechnic charge is preferably employed as the source of pressurized gas. The pyrotechnic charges utilized here are similar to those used for airbags. Accordingly, said pyrotechnic charges may also be triggered by a crash sensor in a manner similar to that used for enabling airbags. In an alternative configuration, a compressed gas bottle such as a $CO_2$ bottle is used. Normally, it is inactive, meaning locked. It is released by an electrical pulse.

The pressurized gas source communicates with the container. It may be located in said container or be connected to said container through a channel. It is thereby advantageous to provide a buffer reservoir that is disposed between the source and the container and buffers the initial pressure surge of the compressed gas source that may occur upon release of the latter, thus protecting the container from overpressure. Thus, the container is subjected to a pressure that is lower than a prescribed threshold pressure.

The trigger device is preferably operated electrically. As a result, it may be actuated in a suited manner by a crash sensor.

In a particularly advantageous design feature of the invention, the supporting member is caused to move relative to the at least one bar in the event of an accident. No visible difference can be observed between this headrest and a normal headrest that is not equipped in accordance with the invention. All the drives means and the like may be concealed within the headrest, more specifically within the padding or the casing of the padding. The additional crash position will only become apparent in the event of an accident. The electrical leads may be disposed within the bars and the bars themselves may also be used as electrical leads.

From the utilization position into the crash position the supporting member moves both in the z-direction and, as a result thereof, upward by for example 2 to 10 cm, preferably by 4 to 8 cm, and toward the front, in the positive x-direction, by for example 2 to 8 cm, preferably by 3 to 6 cm. The crash position it now assumes is advantageous for rear collisions. The trigger device is preferably released when the crash sensor senses a rear collision.

BRIEF DESCRIPTION OF THE DRAWINGS

Other features and advantages of the invention will become more apparent upon reviewing the appended claims and the following non restrictive description of embodiments of the invention, given by way of example only with reference to the drawing. In said drawing:

DETAILED DESCRIPTION

Figure 1:
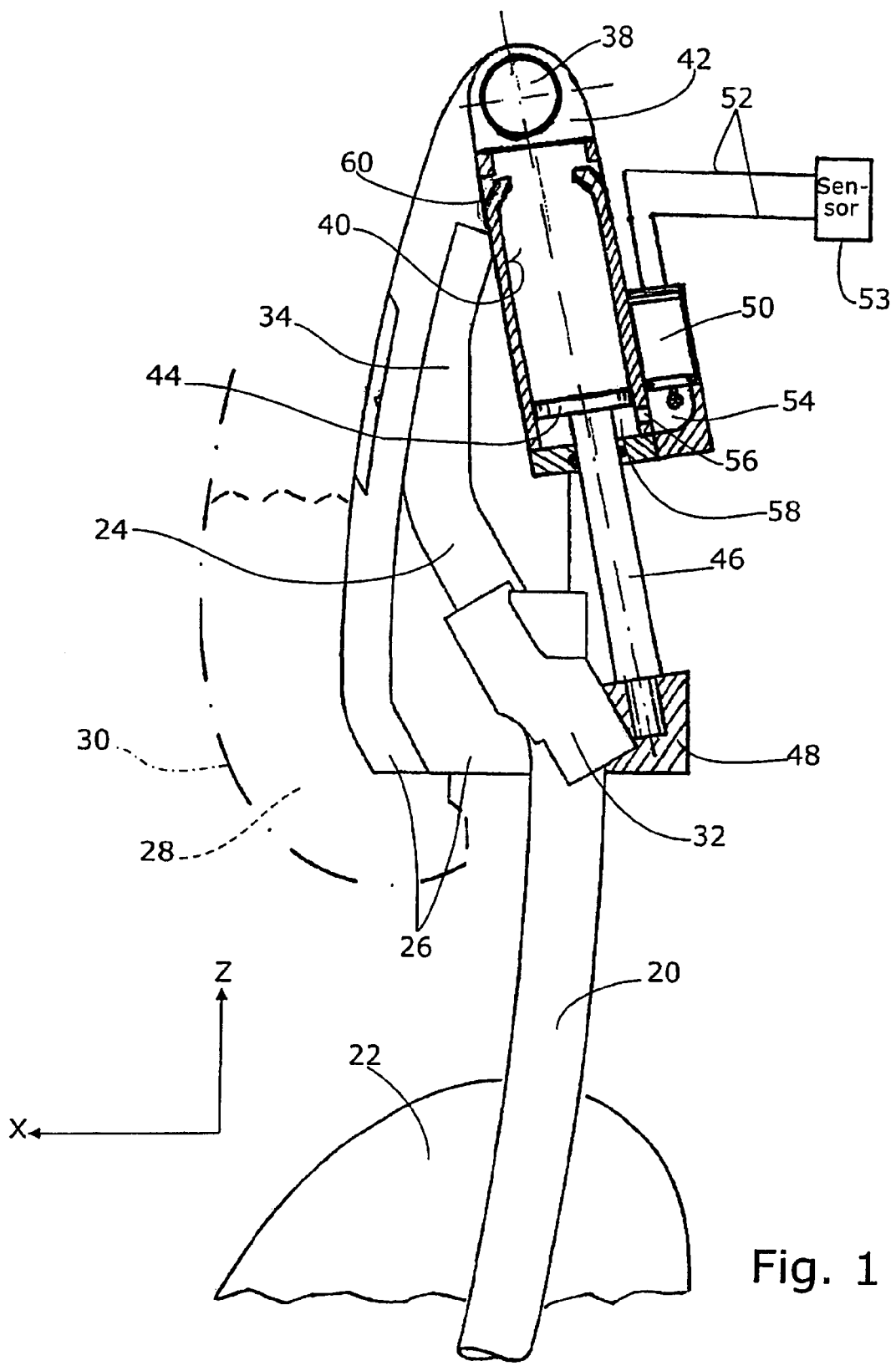
FIG. 1: is a schematic diagram of a headrest that is connected to a seat back, a top region of which only is shown, with the headrest being in the utilization position.

The following description makes use of the coordinate system currently utilized in automotive engineering, with the x-axis in the direction of travel, with the y-axis transverse to said direction of travel and pointing toward the left and with the z-direction oriented perpendicular and upward, see FIG. 1. The headrest has two bars 20 that are retained in a seat back 22, the bars 20 can be displaced in their longitudinal direction relative to said seat back 22 for permitting height adjustment of the headrest.

The bars 20 are bent several times. The bends are located within the contours of the supporting member 26. As shown in FIG. 1, the bar 20 has at least one (lower) oblique portion 24 that extends approximately in the direction in which the movement is intended to be executed toward the front and toward the top. According to the embodiment as shown in FIG. 2, there is also provided an upper oblique portion 25 that is oriented parallel to the lower oblique portion 24.

The bars 20 carry a supporting member 26. In the exemplary embodiments as shown in FIG. 1 and FIG. 2, it is substantially made from one piece of plastic material, e.g., by injection moulding. It carries a padding 28. On its outer side, said padding is covered and enclosed by a cover 30 or the like.

The supporting member 26 has two guiding parts 32 that are located in the lower oblique portion 24 around which they form a more or less surrounding grip. In the utilization position, said guiding parts 32 are in the lowermost part of the lower oblique portion 24 where said oblique portion 24 merges into a bend interrupting the normal course of the bars. The oblique portion 24 is so long and is configured in such a manner that, when the supporting member 26 is in the crash position, the guiding parts 32 are located at the upper end of the lower oblique portion 24, meaning in the region where it merges into a bow region 34, see FIG. 2. The guiding parts 32 may be displaced along the oblique portions 24.

Figure 2:
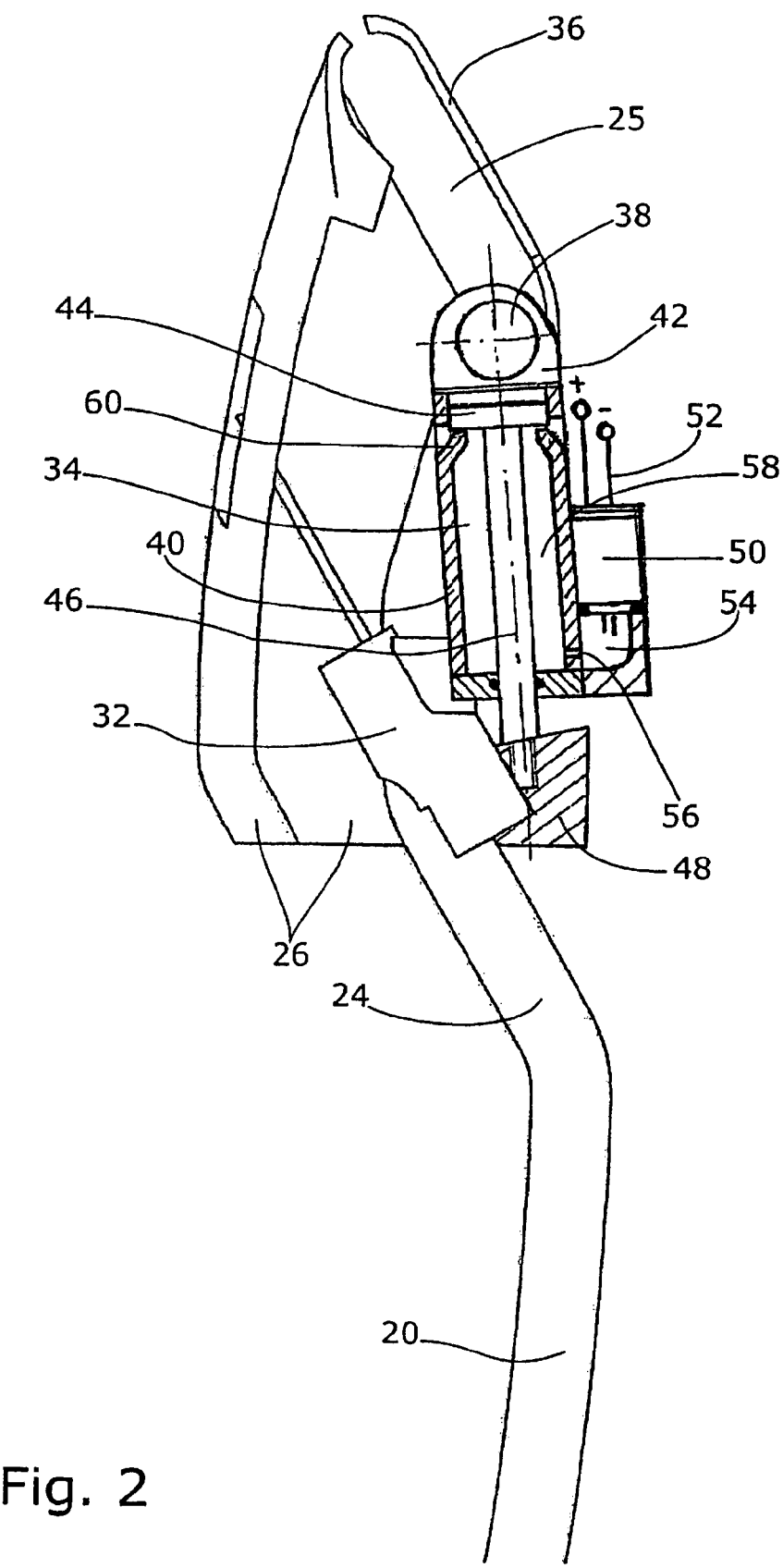
FIG. 2: is a side view like FIG. 1 of a second embodiment of the headrest, but now in the crash position.

In the implementation as shown in FIG. 2, in which there is also provided an upper oblique portion 25, additional upper guiding means are provided for guiding the supporting member 26 along the upper oblique portion 25. Like the path of the guiding parts 32 in the lower oblique portion 24, the path of the supporting member 26 in the upper oblique portion 25 is bounded. A loop 36 is for example used as the upper guiding part. It cooperates with a cross-tie member 36 that joins the two bars 20 together at the uppermost end of the bow region 34.

At the cross-tie member 36, there is linked a cylinder 40 of the expandable container; for this purpose, the cylinder 40 has a connecting piece 42 located at its upper end. A piston 44 is slidably guided within cylinder 40. Cylinder 40 and piston 44 define an expansion space 58. The piston 44 has a piston rod 46 that is supported by an abutment 48. Said abutment is part of the supporting member 26 and is located between the two bars 20. The abutment 48 is substantially located between the two guiding parts 32 and is disposed within the contour of the actual headrest body.

In proximity to the cylinder 40 there is disposed a pyrotechnic charge 50 connected thereto. It is constructed like a primer that more specifically has a discharge end pointing downwards. Toward the top, electric leads 52 protrude from the primer, they are connected to a crash sensor 53 that performs control functions and forms the trigger device. The discharge opening is located in a chamber 54 that is connected to the actual expansion space 58 through a passage 56. In the chamber 54, a first high pressure surge is allowed to drop, it is configured accordingly. As a result, the expansion space 58 is only loaded with a pressure for which the piston and cylinder unit has been designed. The expandable container 40, 44 is not subjected to a pressure in excess of a threshold pressure of e.g., 200 bar.

If the pyrotechnic charge 50; 68 is ignited, the chamber 54 fills with propellant gas that flows through passage 56 and reaches the expansion space 58. The expansion space is the work space of the expandable container. Preferably the source of pressurized gas is a solid propellant charge. The gas pressure causes the expansion space 58 to increase in volume, the cylinder 40 is pulled downward, the piston remains stationary. Put another way, the cylinder and piston arrangement contracts. Once the piston 44 has travelled the major portion of the allowable distance within the cylinder 40, it arrives behind a return stop 60. Said return stop prevents the piston from travelling back, even if the supporting member 26 is loaded. As a result, it retains and secures the supporting member 26 in the crash position. In the concrete exemplary embodiments, it is realized by tongues that have been cut out from the jacket of cylinder 40 and project inward at an incline.

Figure 3:
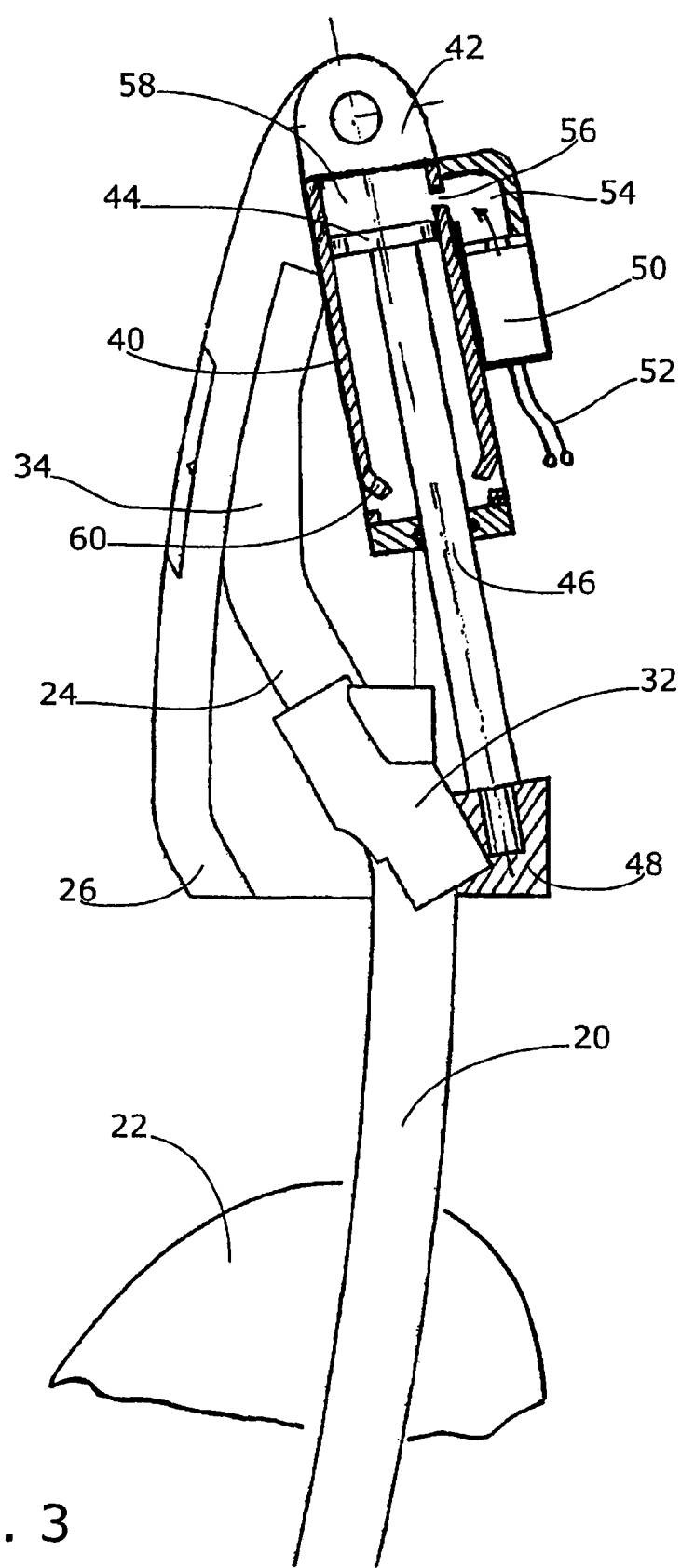
FIG. 3: is a side view like FIG. 1 of a third embodiment of the headrest in the utilization position.

In contrast to the exemplary embodiments as shown in the FIGS. 1 and 2, the variant as shown in FIG. 3 is operated with tensile force and not with compressive force. Now, the connecting piece 42 that is connected to the cylinder 40 is hinge-linked thereto in the upper region of the supporting member 26. Now, the piston rod 46 is supported by the bars 20 via the abutment 48. The expansion space 58 is now located in immediate proximity to the connecting piece 42.

Figure 4:
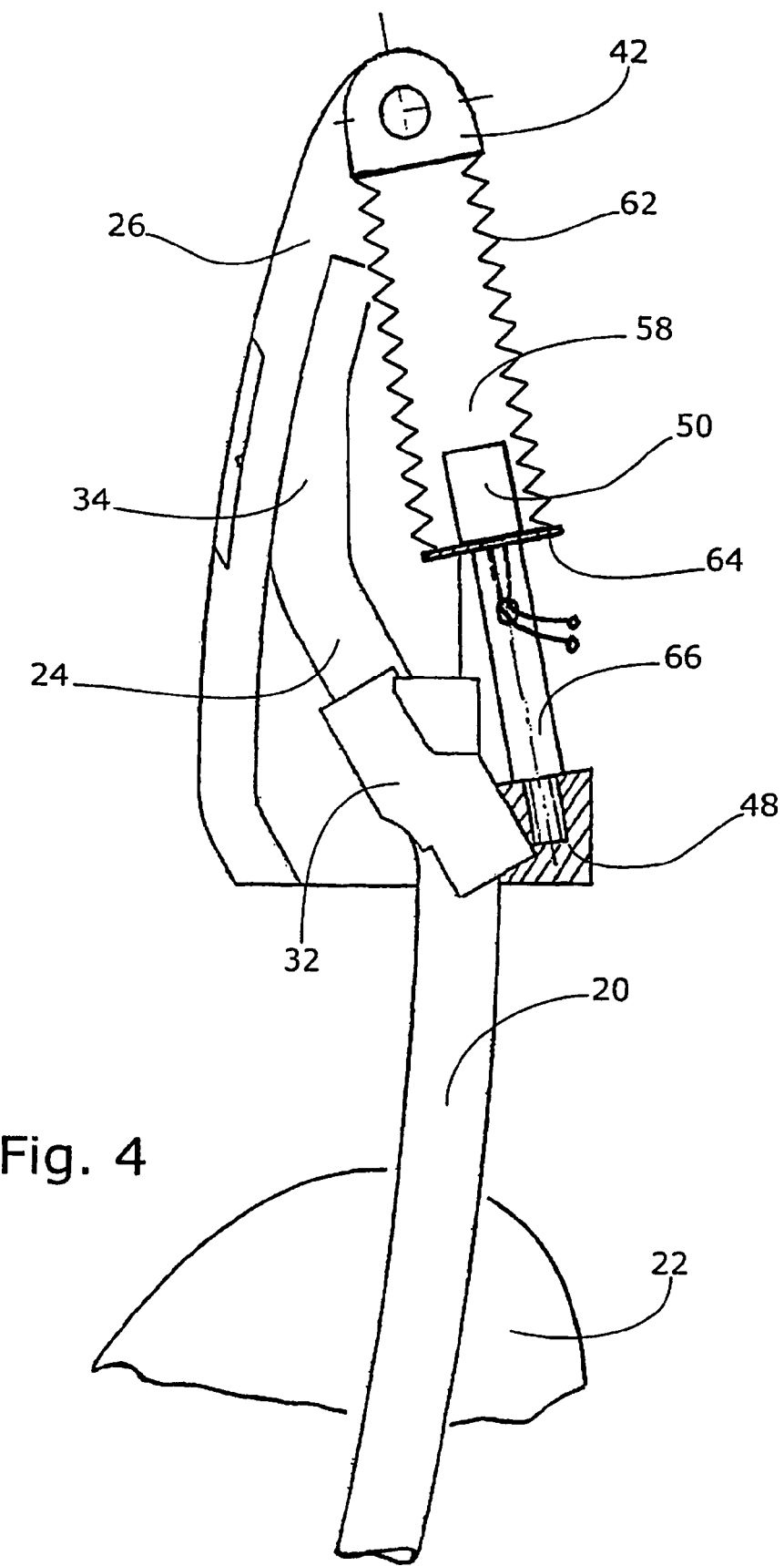
FIG. 4: is a side view like FIG. 1 of a fourth embodiment of the headrest in the utilization position.

In the embodiment as shown in FIG. 4, the expandable container is realized by a pleated bellows 62. It may for example be made from an elastomeric or a plastic material. Said pleated bellows 62 is disposed between a connecting piece 42 and a plate 64, thus defining a sealed expansion space 58. The plate 64 is connected to the abutment 48 via a tube portion 66. Said abutment is in turn fastened to a crosspiece (not shown) that joins the two bars 20 together. The connecting piece 42 is hinged to the supporting member 26 in proximity to an upper end region of said supporting member 26.

In the configuration as shown in FIG. 4, a pyrotechnic charge 50 is located within the expansion space 58. Its structure is the same as in the afore mentioned exemplary embodiments, meaning it is also implemented as a powder charge. The leads 52 run through the plate 64 and in the interior of the tube portion 66 before exiting outside thereof through an opening.

Figure 5:
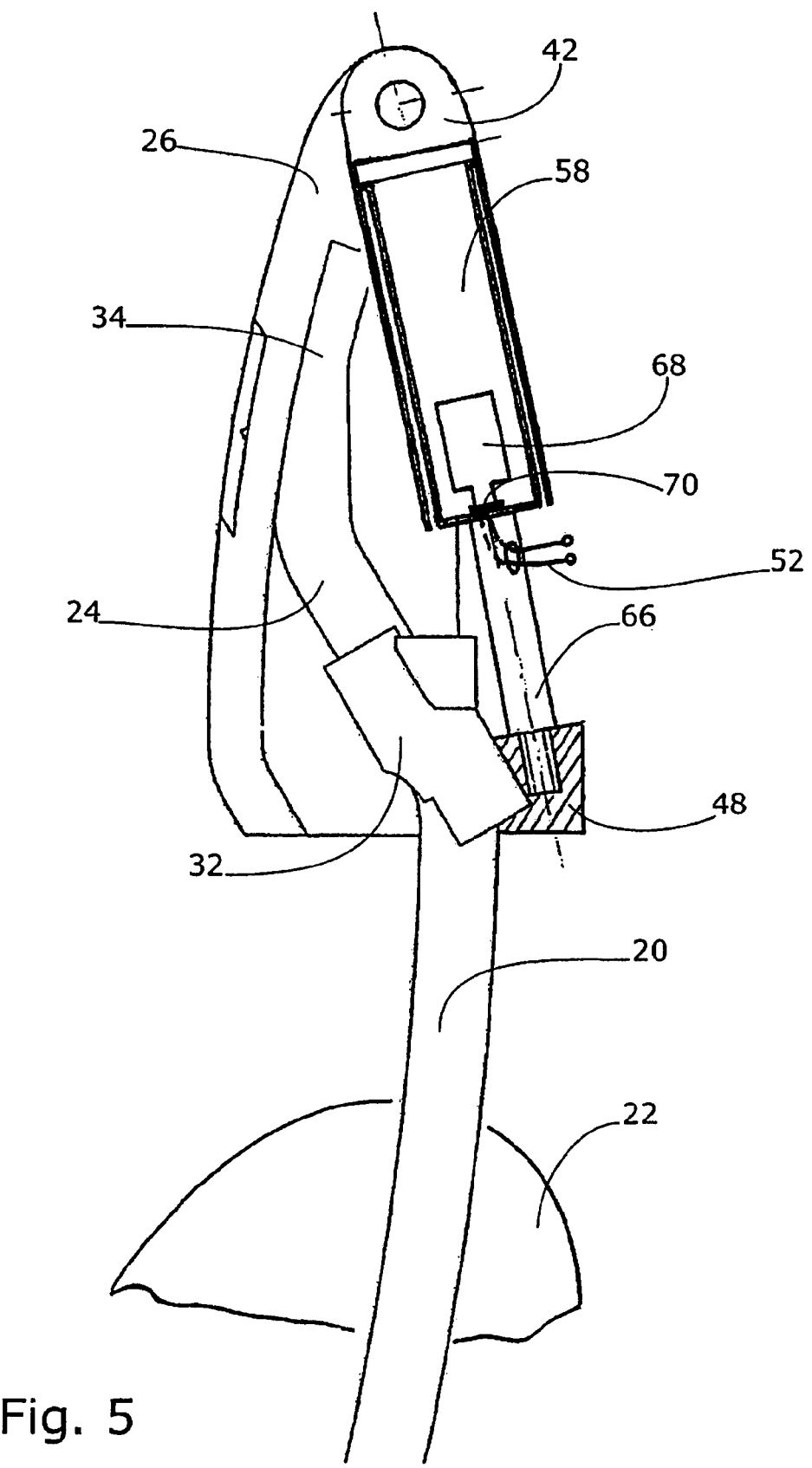
FIG. 5: is a side view like FIG. 1 of a fifth embodiment of the headrest in the utilization position.

In the configuration as shown in FIG. 5, the expandable container is in turn formed by a cylinder 40 and a piston 44 that is now configured to be a hollow piston. The cylinder 40 is connected to the connecting piece 42 that is hinged to the supporting member 26 in the upper region thereof. The piston is connected to a tube portion 66 that in turn provides passage for the electrical lead 52 therethrough.

Like in FIG. 4, the source of pressurized gas is again disposed within the expansion space 58. It is now configured to be a pressurized gas container 68 that is filled with a highly pressurized non-toxic gas such as $CO_2$. The pressurized gas container 68 is tightly closed in its lowermost region by an ignition plate 70. Said ignition plate is connected to the lead 52. When the ignition plate is electrically ignited, the pressurized gas container 68 is open at the neck of the bottle and the pressurized gas it contains is allowed to fill the expansion space 58.

Like in the exemplary embodiments as shown in the FIGS. 3 and 4, the abutment 48, which is respectively connected to the piston rod 46 or to the tube portion 66, is fixed to the bars 20 whilst the connecting piece 42 is connected to the supporting member 26. If the expansion space 48 is under pressure, the piston 44 moves upward and brings the supporting member 26 into the crash position. Reduced-size airbags may also be used as the expandable container.

The invention claimed is:

1. A headrest of an automotive vehicle with a carrier structure comprising:
   at least one bar having at least one oblique portion and a supporting member having a guiding part that cooperates with the at least one oblique portion, said supporting member is normally in a utilization position and, in the event of an accident of the automotive vehicle, leaves the utilization position, whereby the guiding part is displaced along the at least one oblique portion, and assumes a crash position in which the supporting member is located in front of the utilization position at least in the x-direction and said oblique portion extends in the direction of the movement of the supporting member between said utilization position and said crash position; and
   an expandable container is disposed between the bar and the supporting member, the expandable container normally is in a non-expanded state, a source of pressurized gas is provided, which is connected to the container, the source of pressurized gas is normally inactive, there is provided a trigger device which is associated with the source of pressurized gas and releases the source of pressurized gas in the event of an accident so that, in the event of an accident, the expandable container is filled with pressurized gas from the source of pressurized gas and is in an expanded state so that the supporting member is in the crash position.

2. The headrest as set forth in claim 1, wherein the source of pressurized gas is a solid propellant charge.

3. The headrest as set forth in claim 1, wherein the expandable container comprises a cylinder and a piston guided therein and that the piston is connected to the supporting member and the cylinder to the bar or, vice versa, the piston is connected to the bar and the cylinder to the supporting member.

4. The headrest as set forth in claim 1, further comprising means for securing the headrest in the crash position.

5. The headrest as set forth in claim 4, wherein the retaining means is the expandable container in the expanded state.

6. The headrest as set forth in claim 1, wherein the source of pressurized gas is located in the expandable container or that the source of pressurized gas is located outside of the expandable container and is connected to the expandable container through a connecting channel.

7. The headrest as set forth in claim 1, wherein there is provided an expansion space that buffers a primary, high pressure surge occurring when the trigger device is enabled so that the expandable container is not subjected to a pressure in excess of a threshold pressure.

8. The headrest as set forth in claim 1, wherein the expandable container substantially is a bellows, that the bellows is readily expandable in an axial direction, but difficult to expand in a radial direction and that the bellows fits at one end against the supporting member and at the other end against the bar.

9. The headrest as set forth in claim 1, wherein the source of pressurized gas is a pressurized gas container that is connected to the expandable container through a normally closed connection that is to be opened by the trigger device or that is located in the expandable container.

10. The headrest as set forth in claim 1, wherein a padding is provided, which padding is carried by the supporting member.

11. The headrest as set forth in claim 1, wherein the source of pressurized gas is an electrically ignitable propellant charge.

* * * * *